US009311302B2

(12) United States Patent
Zhu et al.

(10) Patent No.: US 9,311,302 B2
(45) Date of Patent: Apr. 12, 2016

(54) METHOD, SYSTEM AND MEDIUM FOR CHARACTER CONVERSION BETWEEN DIFFERENT REGIONAL VERSIONS OF A LANGUAGE ESPECIALLY BETWEEN SIMPLIFIED CHINESE AND TRADITIONAL CHINESE

(75) Inventors: Chunshen Zhu, Hong Kong (CN); Tianyong Hao, Hong Kong (CN)

(73) Assignee: CITY UNIVERSITY OF HONG KONG (CN)

( * ) Notice: Subject to any disclaimer, the term of this patent is extended or adjusted under 35 U.S.C. 154(b) by 541 days.

(21) Appl. No.: 13/527,314

(22) Filed: Jun. 19, 2012

(65) Prior Publication Data
US 2013/0338994 A1 Dec. 19, 2013

(51) Int. Cl.
*G06F 17/28* (2006.01)

(52) U.S. Cl.
CPC .................................. *G06F 17/2863* (2013.01)

(58) Field of Classification Search
CPC . G06F 17/289; G06F 17/2854; G06F 9/4448; G06F 17/2836; G06F 17/30669; G06F 17/30985; G06F 17/28; G06F 17/2818; G06F 17/2827; G06F 17/30427; G06F 17/30731; G06F 17/30598; G06F 17/30705
USPC ............... 704/1–10, 251, 255, 257, 277, 270, 704/250; 455/566
See application file for complete search history.

(56) References Cited

U.S. PATENT DOCUMENTS

2002/0045463 A1* 4/2002 Chen et al. .................... 455/566
2008/0312901 A1* 12/2008 Torii et al. ......................... 704/2

OTHER PUBLICATIONS

Wang, Xiaoming et al., "Discussion of Key Problems in Simplified-Traditional Chinese Character Conversion", In Proceedings of the 5th Chinese Digitization Forum, pp. 148-155, 2008.
Li, Min-Hsiang et al., "Chinese Characters Conversion System based on Lookup Table and Language Model", Proceedings of the 22nd Conference on Computational Linguistics and Speech Processing, pp. 113-127, Puli, Nantou, Taiwan, Sep. 2010.
Halpern, Jack et al., "The Pitfalls and Complexities of Chinese to Chinese Conversion", The CJK Dictionary Institute, Inc., Fourteenth International Unicode Conference in Boston, pp. 1-25, 1999.
Wang, Ning et al., "The Conversion of Chinese Characters and its Communication in Greater China", In Proceedings of the 3th Chinese Digitization Forum, pp. 1-20, 2005.
Halpern, Jack et al., "Liguistic Issues in Chinese to Chinese Conversion", The CJK Dictionary Institute, Inc., Multilingual Computing, pp. 1-9, 1999.

(Continued)

*Primary Examiner* — Huyen Vo
(74) *Attorney, Agent, or Firm* — Amster, Rothstein & Ebenstein LLP

(57) ABSTRACT

Method, system and medium for character converting between different regional versions of a language especially between Simplified Chinese and Traditional Chinese are provided. The method comprises finding for the source character a target character, for example by finding the target character in a desired data resource from the plurality of data resources which are managed by a multiple category management model with regard to data resources' priorities. The method may offer users greater flexibility in choosing the data resources most appropriate to their conversion purposes to increase the efficiency and accuracy of the conversion, and meanwhile does not have to search all the data resources before offering a conversion candidate in each operation, thereby shortening the running time of conversion.

21 Claims, 6 Drawing Sheets

(56) References Cited

OTHER PUBLICATIONS

Liu, Huidan et al., "A Multi-layer System of Simplified-Traditional Chinese Character Conversion Based on Word Disambiguation", In Proceeding of the 5th Chinese Digitization Forum, pp. 156-167, 2008.

Xin, Chun-Sheng, et al., Design and Implementation of a Simplified-Unsimplified Chinese Character Conversion System, Institute of Software, The Chinese Academy of Sciences, Beijing, CN, pp. 1534-1540, Sep. 6, 1999.

Zhang, Wei et al., "An Effective Method of Arbitrary Length N-gram Statistics for Chinese Text", International Journal of Digital Content Technology and its Applications., pp. 143-155, vol. 5, No. 3, Mar. 2011.

Zhang, Wei et al., "A Copy Detection Method for Chinese Text by Character Based N-gram", Journal of Convergence Information Technology, pp. 277-282, vol. 6, No. 3, Mar. 2011.

LDC Catolog, "Tagged Chinese Gigaword Version 2.0", http://www.ldc.upenn.edu/Catalog/CatalogEntry.jsp?catalogId=LDC2009T14, pp. 1-3, Jul. 19, 2012.

STGuru Introduction (latest version 4.3), http://www.speedy7.com/cn/stguru/english/index.html, pp. 1-2, Jul. 19, 2012.

Zhu, Chunshen and Hao, Tianyong, Simplified-Traditional Chinese Character Conversion Based on Multi-Data Resources: Towards a Fused Conversion Algorithm; International Conference, Jun. 12-23, 2011.

Zhu, Chunshen and Hao, Tianyong, Simplified-Traditional Chinese Character Conversion Based on Multi-Data Resources: Towards a Fused Conversion Algorithm; International Journal of Advancements in Computing Technology, vol. 3, No. 7, Aug. 2011.

\* cited by examiner

| Categories | Data resources | Preference priority/ Usage conflict | Authority priority |
|---|---|---|---|
| Personal | Personal Dictionary | 1 | 1 |
| Regional terms | Mapping Table of Common Words Used in Mainland and Taiwan | 2/optional | 1 |
| | Mapping Table of Common Words Used in Mainland and Hong Kong | | 1 |
| Words | The Comprehensive Chinese Dictionary | 3 | 1 |
| | Dictionary of Chinese Word Segmentation | | 2 |
| One-to-many characters | Common Mistakes in Character Conversion Between Simplified and Traditional Chinese | 4 | 1 |
| | Wikepedia: Resources for Chinese Character Conversion | | 2 |
| One-to-one characters | Complete Table of Simplified Characters | 5 | 1 |

FIG.1C

| Categories | Years | # Files | Size(MB) | #Words(*thou.*) | #Documents |
|---|---|---|---|---|---|
| Central News Agency | 1991-2004 | 168 | 6,136 | 501,456 | 1,769,953 |
| Xinhua News Agency | 1991-2004 | 168 | 3,755 | 311,660 | 992,261 |
| Zaobao Newspaper | 2001-2003 | 10 | 214 | 18,632 | 41,418 |
| *Total* | | 346 | 10,105 | 831,748 | 2,803,632 |

| Extracted words | Frequencies |
|---|---|
| 臺訊 | 1954 |
| 川崎 | 229 |
| 難為 | 293 |
| 發包 | 4373 |
| 適從 | 380 |
| 布羅 | 673 |

FIG.5

| Categories | Data resources | # Entries |
|---|---|---|
| Regional terms | *Mapping Table of Common Words Used in Mainland and Taiwan* | 445 |
| | *Mapping Table of Common Words Used in Mainland and Hong Kong* | 229 |
| Words | *The Comprehensive Chinese Dictionary* | 51,027 |
| | *Dictionary of Chinese Word Segmentation* | 55,072 |
| One-to-many characters | *Common Mistakes in Character Conversion Between Simplified and Traditional Chinese* | 132 |
| | *Wikepedia: Resources for Chinese Character Conversion* | 364 |
| One-to-one characters | *Complete Table of Simplified Characters* | 2,393 |

FIG.6

| Methods compared | Precision |
|---|---|
| Word 2003 | 0.99363 |
| Word 2010 | 0.99442 |
| STGuru | 0.99482 |
| Google translate | 0.99522 |
| Li's method | 0.99602 |
| FCMD | 0.99681 |

| Algorithm | Time used | Average |
|---|---|---|
| FCMD | 2.32 s | 2.32 s |
| | 2.31 s | |
| | 2.33 s | |
| Li's Algorithm | 2.73 s | 2.67 s |
| | 2.66 s | |
| | 2.64 s | |

METHOD, SYSTEM AND MEDIUM FOR CHARACTER CONVERSION BETWEEN DIFFERENT REGIONAL VERSIONS OF A LANGUAGE ESPECIALLY BETWEEN SIMPLIFIED CHINESE AND TRADITIONAL CHINESE

FIELD OF THE INVENTION

This application relates to word processing technology, and in particular relates to processing method, system and medium for character script or word spelling conversion within a language, e.g., between regional variations of such script/spelling of a character/word within the same language, albeit it has an immediate application in conversion between the Simplified Chinese and Traditional Chinese scripts.

BACKGROUND OF THE INVENTION

The rapid development of information and network technologies facilitates efficient information exchanges on an everyday basis especially via on-line communication. More specifically, in recent years, communication between Chinese communities in different parts of the world has been on a constant increase. However, such advantage may not have been fully enjoyed by Chinese users, as there are two script versions of written characters currently in use in different Chinese communities, i.e., the BIG5 code Traditional Version of Chinese characters (henceforth TC) prevalent in such regions as Hong Kong, Macao and Taiwan, and the GB code Simplified Version of Chinese characters (henceforth SC) in mainland China and Singapore, among others. Admittedly, the majority of the SC characters are either identical with their TC counterparts, e.g. 人 and 人 (ren "human") or formally "simplified" from their TC counterparts without any change in meaning or usage, such as the SC 肤 (fu) and the TC 膚 (fu) in 皮肤/膚 (pi-fu "skin") While such cases require no more than a straightforward one-to-one converting operation, it is of interest to note that, of the 41,321 SC characters we have surveyed 1,404, or 3.398%, are one-to-many cases in which an SC character has several TC counterparts different in semantic meaning. For example, the SC 发 (fa) should be 發 in 發展 (fa-zhan "development") but 髮 in 毛髮 (mao-fa "hair") (see also [1], p. 150). On top of that, complexity may also arise on the word level, for instance, because of regional variations even though no SC-TC conversion is involved.

As a result, between the traditional version of Chinese characters and the simplified one, subtle yet extensive differences in both formation and usage may result in unexpected hindrances to verbal communication, largely because of the one-to-many cases where a simplified character has more than one equivalent in the traditional version with different semantic meanings.

A variety of automatic conversion tools have been developed and installed for general use in nearly every Office-kind tool in the market, such as Microsoft Office, Sun Open Office and KingSoft WPS. Free software systems and applications are also easily available online. Conversion results produced by these tools, however, often fall short of a professional standard, i.e. precision of the conversion results is not high enough for professional uses especially when one-to-many cases are involved.

In serious or high-end document processing such as diplomatic documentation, public discourse and TV subtitling, a flawed conversion can cause unexpected or even serious problems. For such document processing, errors in machine conversion have to be rectified manually, which is a costly operation. Yet, since the characters have been converted automatically and "quietly", so to speak, without leaving behind any traceable marking, human editing can turn out to be a tedious and time consuming operation to check out all such changes for verification and rectification purposes.

One of the most recent developments is the conversion system proposed by Min-Hsiang Li, Shih-Hung Wu, "Chinese Characters Conversion System based on Lookup Table and Language Model", issued in *Proceedings of the Conference on Computational Linguistics and Speech Processing*, pp. 113-127, 2010 (henceforth Li's method or Li's system), which uses a methodology termed by the authors as "lookup table" and "language model" to disambiguate one-to-many cases and to tackle regional variations of lexical terms, with all the data coming from Wikipedia. The experimental results show that the system outperforms other popular conversion systems significantly in terms of conversion precision. However, relying solely on one data resource without recourse to other more authoritative data resources cannot ensure conversion quality especially in view of the fact that some mappings may differ in different data resources. The performance is also slowed down by the large-scale N-Gram calculations the system has to go through in every conversion operation.

SUMMARY OF THE INVENTION

In a general aspect, this application is directed to a method, a system and a Medium for converting regional versions of a character/word within the same language, especially between Simplified and Traditional Chinese character scripts, which can enhance the accuracy of such character conversions in terms of semantic correctness and localization, by automatically determining the most pertinent data resource(s) in each operation of such conversion.

According to some aspects, one of the objectives of the application is to provide a method, a system and a Medium for character converting between different regional versions of a language, especially for simplified-Traditional Chinese Character Conversion supported by a plurality of data resources. The data resources may be managed according to their priority statuses, which may effectively improve the accuracy of the conversion results.

According to some aspects, another objective of the application is to provide a method, a system and a Medium for character conversion between different regional versions of a language, especially for Simplified-Traditional Chinese Character Conversion, which may perform with satisfactory accuracy script conversions, based on categories comprising any combination of at least personal category, regional terms category, words category, one-to-many-characters category, and one-to-one characters category, when dealing with one-to-many cases as well as regional variations of terminology in automatic character conversion. The categories are indicated by priority items which indicate levels of at least two kinds of priorities: a preference priority and an authority priority.

According to some aspects, still another objective of the application is to provide a method, a system and a Medium for character conversion between different regional versions of a language, especially for Simplified-Traditional Chinese Character Conversion, which may solve the frequently encountered problem of data conflict when conversion candidates are respectively from different data resources, e.g. data conflicts among authoritative publications (such as established dictionaries) and informal on-line resources.

According to some aspects, a further objective of the application is to provide a method, a system and a Medium for character converting between different regional versions of a language, especially for Simplified-Traditional Chinese Character Conversion, which may offer users greater flexibility in choosing the data resources most appropriate to their conversion purposes to increase the efficiency and accuracy of the conversion, and meanwhile does not have to search all the data resources before offering a conversion candidate in each operation, thereby shortening the running time of conversion. Greater flexibility in actual use can be achieved by finding the desired data resource via the multiple categories indicated by the priority items together with usage conflict items which indicate usage conflict degrees of data resources within each category. The usage conflict degrees comprise any combination of at least "all", "optional" and "conflict". The efficiency and accuracy of the conversion and the shortened running time can be achieved by matching and converting one-to-many characters using both priority probability and N-Gram-based probability.

The application may be used in word processing systems involving the Chinese language, especially if such systems are to cater for the needs of serious private users as well as institutional users in such industries as publication, mass media, and government documentation.

The application may also be applied to the development of software systems that are based on differentiated multi-data resources.

BRIEF DESCRIPTION OF THE DRAWINGS

Various embodiments of the present invention are described herein by way of example in conjunction with the following figures wherein:

FIG. 1C is a table exemplifying a multiple category management model comprising multi-data resources with their categorizations as well as corresponding preference priorities and authority priorities of a first embodiment according to some aspects of the application;

FIG. 5 shows a part of the trained result for the evaluation of the second embodiment according to some aspect of the application;

FIG. 6 is a table showing an example of the data resources and the numbers of entries for the evaluation of the second embodiment according to some aspect of the application;

DETAILED DESCRIPTION OF THE INVENTION

In order to make the object, technical solution and advantages of the present application more clear, the method, the system and the Medium for simplified-Traditional Chinese Character Conversion of the present application will be further described in detail in conjunction with accompanying drawings and embodiments. It should be understood, however, the embodiments described herein are only intended for illustrating, but not for limiting the present invention.

In embodiments and the claims, the words "a", "an", "one", "the" and "said" may generally refer to singular or plural unless a specific definition of the article is given in the description.

The words "about" or "approximate" used herein are used to modify any quantity capable of changing slightly, while this slight change does not alter its essence. Unless specified in the embodiments in particular, the error range of the values modified by the words "about" or "approximate" is usually within 20 percent, preferably within 10 percent, and more preferably within 5 percent.

Figure 1A:
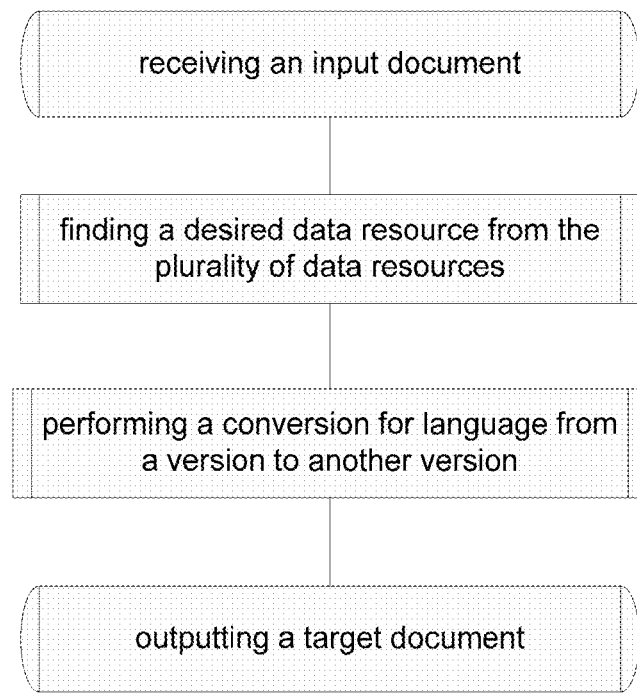
FIG. 1A is a diagram of a process for converting language from a version of the language to another version of the language according to the application.

FIG. 1A shows a diagram exemplifying a process of script conversion from one version of the language to another version of the same language.

As used herein, "character conversion" and "script conversion" in the present application mean converting a character between it's different script versions in view of different regional variations of a same language, e.g. between two script versions of Chinese written characters currently in use in different Chinese communities, i.e., the BIG5 code Traditional Version of Chinese characters (henceforth TC) prevalent in such regions as Hong Kong, Macao and Taiwan, and the GB code Simplified Version of Chinese characters (henceforth SC) in mainland China and Singapore.

Figure 1B:
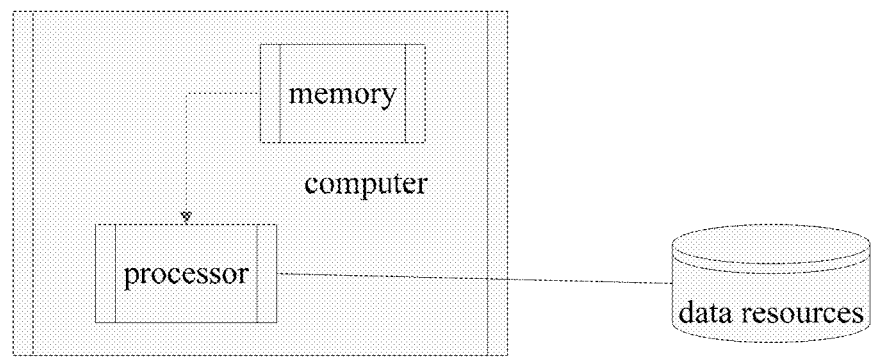
FIG. 1B is a diagram of a computer system for converting language from a version of the language to another version of the language according to the application.

The process is implemented by a computer system comprising a computer processor and a tangible memory that stores instructions for controlling the computer processor. The computer system is for example as shown in FIG. 1B. Further, the computer system is in communication with a multiple category management model of the invention coupled to a plurality of data resources that stores data items regarding a version of a language and another version of the language. Some or all of the data resources may be incorporated into the model with regard to the data resources' priorities in the computer system, i.e. local searchable data resources. However, some or all of the data resources may be separate from the model, for example they can be external data resources coupled with the model and being accessible via the internet or other types of network.

Referring to FIG. 1A, the process comprises: a first step of receiving an input document, a second step of finding for the source character a target character, for example by finding the target character in a desired data resource from the plurality of data resources which are managed by a multiple category management model with regard to data resources' priorities in each conversion; a third step of performing a conversion from the version of the language to the other version of the language for the input document based on data items in the desired data resource, and a fourth step of outputting a target document.

The input document may be a character, a word, a sentence, M sentences, an article, or a book. The word may consist of two or more characters, and the sentence of two or more words; and the M is an integer greater than 2. In case that the input document is long in content, such as is an article that is made up of multiple sentences or is a book, the beneficial effect of the present application is notable in reducing the running time of the computer system with an improved conversion precision.

In the application, the process is used for converting Chinese from the simplified script of Chinese characters to the traditional one, and vice versa. However, in view of the possibility that other languages may have regional/historical variations in spelling, among other things, this application can also facilitate conversions between different versions within a language of such kind.

The data resources comprise authoritative publications and informal on-line resources among which data conflict exists. The categories comprise any combination of at least personal category, regional terms category, words category, one-to-many-characters category, and one-to-one characters category. And the categories are indicated by priority items which indicate levels of at least two kinds of priorities: a preference priority and an authority priority. FIG. 1C gives an example which comprises the above mentioned 5 categories.

The multiple categories are distinguished by the preference priority so that levels of preference priority are different among the multiple categories. The multiple categories are further indicated by the usage conflict item which indicates usage conflict degrees of data resources within each category. For example, the scale of usage conflict degree comprises "all", "optional" and "conflict". "All" indicates that all the data resources in the category will be used in a conversion operation, "Optional" indicates that the selection of data resource(s) in a conversion operation is determined by the user's preference(s), "Conflict" indicates that the data resources in the category are in conflict and only one resource is to be used in the conversion. Referring to FIG. 1C, the above mentioned 5 categories are indicated respectively by 5 levels of the preference priority, and 2 levels of the authority priority. The regional terms category comprises 2 data resources which are optional.

The second step of finding the desired data resource is conducted by searching a category with the highest preference priority and then determining a data resource with the highest authority and preference priority within the category as the desired data resource.

The second step of finding the desired data resource may be conducted in different ways, such as simultaneously using both the preference priority and the authority priority to calculate a comprehensive priority value of each of the candidates.

After finding the desired data resource in the second step, i.e. the most pertinent data resource, the third step of the conversion in is to maintain a plausible degree of satisfaction.

The fourth step of outputting a target document will be performed until all the characters of the input document have been converted into target characters.

First Embodiment

According to the first embodiment, the application mainly includes three parts: 1) The concepts of the preference priority and authority priority in Chinese character conversion; 2) A strategy of data resource management based on the two priorities; 3) A matching strategy on priority-based multi-data resources for Chinese character conversion.

In the first part, the preference priority is mainly related to users' conversion requirements, for example, whether they prefer their target text to be localized with, say, Taiwan or Hong Kong terms. Under this priority, users can even choose to use their personal term banks compiled with the aid of the System, in which case such personal term banks have the highest priority. The authority priority is mainly related to the status of the data resource a conversion candidate is taken from. Under this priority, for example, 《漢語大辭典》 (henceforth *The Comprehensive Chinese Dictionary*) has a higher status than 《漢語分詞詞典》 (henceforth *The Dictionary of Chinese Word Segmentation*) because of the status of its publication venues. That is, while the former is formally issued either by a government department or an established publisher, the latter is a freelance publication on the WEB.

In the second part, data resources are organized by categories with category usage attributes and their priorities.

Any single data resource may not provide a working pool of words that covers sufficiently especially one-to-many cases for automatic conversion purposes because of the high complexity of the Chinese language and its regional variations. A corpus incorporating more than one data resource can presumably increase conversion capacity and our new priority-based multi-data resource management model proves that such a corpus, thanks to its extended lexical coverage, has a significant advantage in processing delicate cases that may not have been attended to in other models.

Currently, there are a series of data resources, in the form of dictionary or mapping list, which can be used as basic references for character conversion, such as the 《简化字總表》 (henceforth *The Complete Table of Simplified Characters*) and the authoritative multi-volume *The Comprehensive Chinese Dictionary*. Despite their authority and authenticity, however, it is technically impossible for the coverage of such "quality" data resources to keep abreast of the real-time development of regional variations and the constant occurrence of new terms in the reality of language use. Wikipedia, on the other hand, given its easy and unlimited access, always provides a "popular" resource of the most updated language data good for conversion references. Data conflict, therefore, is expected between the quality and the popular resources in constructing and implementing a corpus of multi-data resources. For example, 台历 (tai-li "desk calendar") is converted as 檯曆 in The *Comprehensive Chinese Dictionary* but as 枱曆 in Wikipedia. In this application, thus, the new priority-based multi-data resource management model is introduced, which takes into account the status of a particular data resource, in either character formation or usage, as illustrated with the case of 檯曆/枱曆 above.

In the example shown in FIG. 1C, this model has a total of 5 resource categories: namely, personal term bank, regional term bank, words, one-to-many characters, and one-to-one characters to indicate the status of a data item. In each category, data items can be from more than one data resource. In this example, there are two kinds of priority, i.e. preference priority and authority priority, to evaluate the desirability of conversion candidates from the data resources. However, one skilled in the art could even set up new kinds of priority. The preference priority is mainly related to users' conversion requirements in light of subject matter and regional terminology varieties, for example, whether they prefer their target text to be localized with Taiwan or Hong Kong terms. Under this priority, users can even choose to use their personal term banks compiled with the aid of the System, in which case such personal term banks have the highest priority. The authority priority is mainly related to the status of the data resource that a conversion candidate is taken from. Under this priority, for example, *The Complete Table of Simplified Characters* and *The Comprehensive Chinese Dictionary* have a higher status than *The Dictionary of Chinese Word Segmentation* because of the status of their publication venues. That is, while the former two are formally issued either by a government department or an established publisher, the latter is a freelance publication on the WEB. When there are more than one conversion candidate under the preference priority, the authority priority will be used as the determining factor.

The preference priority is dynamic and more responsive to users' requirements, while the authority priority is static and acts as a stable reference for quality control. The priority-based management model, designed as such, provides facilities for users to easily and efficiently modify and extend their personal collection of data resources into term banks. The user can also choose whether to activate the preference priority or not in an actual operation of conversion.

In this example shown in FIG. 1C, the lexical corpus at present draws on a total of 8 data resources. In addition to the data resources mentioned above, there are two data resources, viz. 《兩岸地區常用詞彙對照表》 (henceforth *Mapping Table of Common Words Used in Mainland and Taiwan*) and 《Wikipedia:粵語用辭》 (henceforth *Wikipedia Mapping Table of Common Words Used in Mainland and Hong Kong*), in the same category. 《的繁互 轉易錯字辨析》 (henceforth *List of Common Mistakes in Character Conversion Between Simplified and Traditional Chinese*), as an additional data resource to the one-to-many category, has the same preference priority value of 4 as the *Wikepedia: Resources for Chinese Character Conversion*.

The category is the type of data resources, for example, *Mapping Table of Common Words Used in Mainland and Taiwan* is a region-oriented data resource.

A category may contain more than one data resource and the data resources may have usage conflict, for example, the user can select a data resource for Hong Kong, Taiwan or even none of them. Therefore, a category is designed to have usage attributes, for example, "All" indicates that all the data resources in the category will be used in a conversion operation, "Optional" indicates that the selection of data resource(s) in a conversion operation is determined by the user's preference(s), and "Conflict" indicates that the data resources in the category are in conflict and only one resource is to be used in the conversion. Usage conflict item provided in the model here allow user to choose his or her preferred data resource, which is subjective based on user's own setting.

An example of usage conflict is shown in FIG. 1C.

Each category is governed by a specific preference priority that is different from the others.

While all the data resources in the same category share the same preference priority value, they are subject to different authority priorities.

In the third part, when the user chooses to activate the preference priority in an actual operation of conversion, data matching for character conversion follows two strategies.

Figure 2:
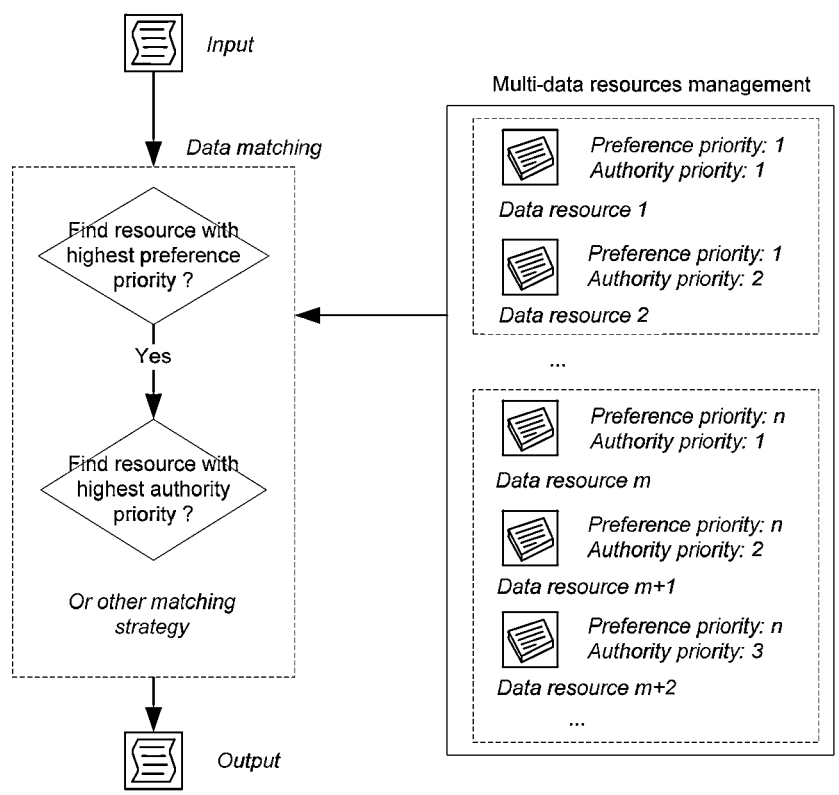
FIG. 2 is a flow chart exemplifying the method for Simplified-Traditional Chinese Character Conversion supported by a plurality of data resources of the first embodiment according to some aspect of the application.

The first strategy checks the preference priority of categories. When conversion candidates are from different data resources that share the same status of preference priority, the matching will resort to the authority priority to determine which candidate to be used for the conversion. A flow chart as shown in FIG. 2 is provided for understanding the first strategy.

The second one is to have simultaneous recourse to both priority schemes and determine a comprehensive priority value of each candidate before the most appropriate character is identified for conversion. If there is n candidate strings $c_1$-$c_n$ (i.e. n candidates, each candidate comprises a character string made up of one or more characters) and a candidate string $c_i$ ($1 \leq i \leq n$) matches a data resource ds ($1 \leq s \leq m$) among m data resources $d_1$-$d_m$, the matching probability of ds and candidate string $c_i$ is calculated by a formula, such as the following equation. Otherwise, the probability is 0.

$$P_{priority}(c_i, ds) = \frac{1}{\sqrt{priority_{preference}(ds) \times priority_{authority}(ds)}}$$

In the equation above, the preference priority and authority priority are used to calculate the probability of the $c_i$ to be chosen as the most qualified conversion candidate. The higher the priority is (the highest being 1), the higher the probability of the $c_i$ to be chosen.

Second Embodiment

Figures 3, 4:
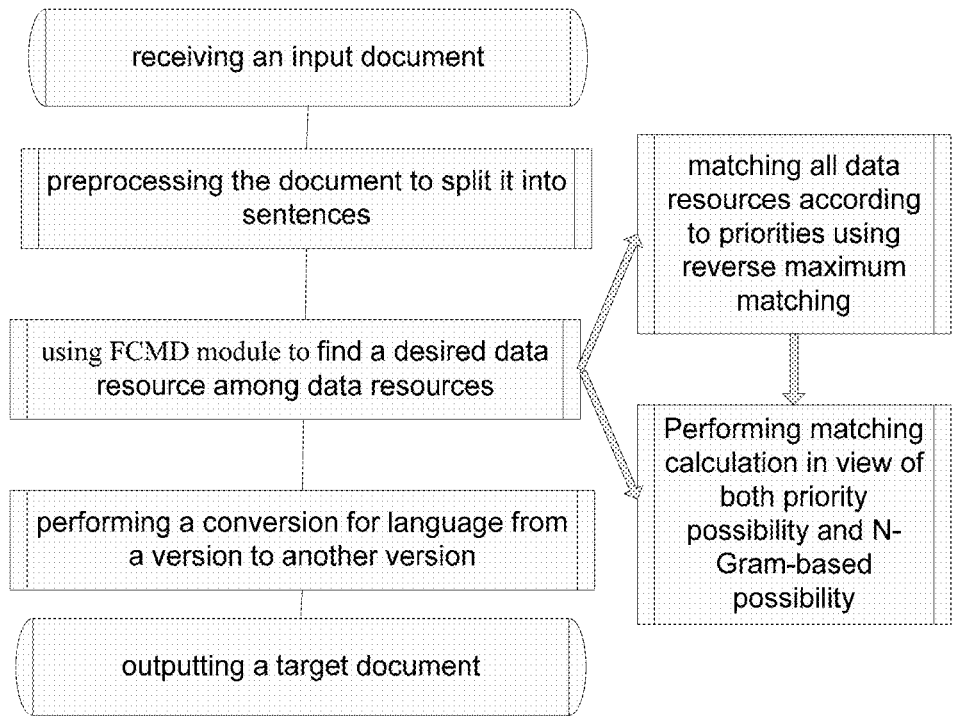
FIG. 3 is a schematic view exemplifying the operation of a second embodiment according to some aspect of the application.
FIG. 4 is a table exemplifying the content of a corpus for the evaluation of the second embodiment according to some aspect of the application.

Referring to FIG. 3, the following description is a second embodiment of the application which exemplifies an operation for an input document.

In a particular operation, after receiving the input document in the first step, the System preprocesses the input document by splitting it into sentences in a second step.

In a third step, a Fused Conversion model from Multi-Data resources (FCMD) is used to perform conversion.

To improve the quality of Chinese character conversion, a new comprehensive algorithm is incorporated. The algorithm includes a revised N-Gram statistical model trained with a large-scale corpus. Instead of relying solely on trained terms, it also draws on multi-data resources described above. Reverse maximum matching is also used in the algorithm to convert the straightforward one-to-one cases found among common terms, compounds and phrases. Since the algorithm proposed is based on varied techniques, we call it "Fused Conversation model from Multi-Data Resources" (FCMD). By this model, characters involved in one-to-many cases are matched at the word level through priority-sensitive matching. The revised N-Gram model is to tackle cases of one-to-many characters and compounds, with a view to improving precision.

Specifically, the Fused Conversion model from Multi-Data resources (FCMD) extracts a string of characters as a candidate string, each time using the reverse maximum matching algorithm. After that, the string is checked against the multi-data resources that are organized in a desired order of priority. If there is a match, the probability of the match to be chosen as the most qualified conversion candidate is then calculated by considering the preference and authority priority. (Refer to Formula 4)

The purpose is to ensure the use of the most pertinent data resource so that the conversion can maintain a plausible degree of satisfaction. However, if the calculated probabilities for two different data resources are the same, the matching will follow the majority rule, which means to use the most recognized candidate across the data resources.

The reverse maximum matching used in the FCMD is a string matching technique. The main idea of string matching is to match a string of characters with the corpus of multiple data resources by using a specific strategy. If a candidate is found matched in the corpus, it is chosen and returned as the matched result. In terms of scan direction, the mentioned specific strategies include forward and reverse matching. In terms of string length, the strategies include maximum and minimum matching [8].

The main algorithm of reverse maximum matching is as follows:

Step1: Input a string s, the length of s as n;
Step2: Set the maximum length of the data resource item as max;
Step3: Extract a sub string from n-max to n as subs, search the data resources. If a candidate is found matched, go to Step 4, otherwise, go to Step 5;
Step 4: Record subs. Set n=n-max, continue with Step 3 until n=0;
Step 5: max=max-1;

The goal of statistical language modeling is to build a language model that can estimate the distribution of terms in natural language as accurately as possible. In practice, N-Gram language models are most commonly used in information retrieval, as they are sufficient to determine the topic in a piece of writing. By using Maximum Likelihood Estimation (MLE), the N-Gram method can calculate the frequency of each word, and therefore the conversion probability of Chinese characters. Details of the N-Gram model have been described in [2] including the smoothing strategy.

The probability of a string to serve as the conversion target is calculated by the probability of the first character multiplied by all the conditional possibilities of the sub strings from the first character to the end of the string as shown in equation (1):

$$P(c_1^n)=P(c_1)\Pi_{k=2}^n P(c_k|c_1^{k-1}) \quad (1)$$

In the equation (1), $P(c_1^n)$ is the probability of a string c to serve as the target including n characters from the first character $c_1$ to the last character $c_n$, which is equal to the probability of the first character $c_1$, i.e. $P(c_1)$ multiplied by all the conditional possibilities of the sub strings from the first character to the end of the string. Since the words of one or two characters are most common in the Chinese language, we use unigram and bigram in the model, which is also similar to the strategy used by Li [2]. According to Interpolated Kneser-Ney smoothing, the formula is then transformed to equation (2):

$$P_{Interpolate}(c_i|c_{i-1})=\lambda \times P_{bigram}(c_i|c_{i-1})+(1-\lambda)\times P_{unigram}(c_i) \quad (2)$$

where $\lambda$ is a weight to balance bigram and unigram. Equation (2) represents the smoothing method to balance the probability of bigram $P_{bigram}$ and the probability of unigram $P_{unigram}$ by weight $\lambda$ based on Interpolated Kneser-Ney smoothing method. At the same time, we also replace Li's probability calculation formula with equation (3) below. The purpose of this change is to avoid the problem of division by 0.

$$P(c_i|c_{i-N+1}^{i-1}) = \frac{\text{Frequency}(c_{i-N+1}^{i-1}c_i)}{\text{Frequency}(c_{i-N+1}^{i-1})+1} \quad (3)$$

Equation (3) represents that the probability of the occurrence of character $c_i$ conditional on the preceding string from character $c_{i-N+1}$ to character $c_{i-1}$ is equal to the value of the occurrence frequency of the whole string of these characters divided by that of the occurrence frequency of the preceding string plus 1. "Occurrence" means showing-up in training texts, which are used to train the FCMD to obtain the best parameter values. The details of training can be seen in the section of "Experiments and evaluation of the second embodiment" in this application. "The preceding" means the characters just before the current character $c_i$. Here it means the string from character $c_{i-N+1}$ to character $c_{i-1}$.

For one-to-many cases, the FCMD operates by matching entries in data resources as well as by using our improved N-Gram model. Therefore, our algorithm works to both calculate the match probability and determine the "most matched" candidate string as the conversion target. If there is n candidate strings $c_1$-$c_n$ and a candidate string $c_i (1 \le i \le n)$ matches a data resource ds ($1 \le s \le m$) among m data resources $d_1$-$d_m$, the matching probability of ds and candidate string $c_i$ is calculated by the equation (4) which is the same as the equation described in the first embodiment. Otherwise, the probability is 0.

$$P_{priority}(c_i, ds) = \frac{1}{\sqrt{priority_{preference}(ds) \times priority_{authority}(ds)}} \quad (4)$$

In the equation (4) above, the preference priority and authority priority are used to calculate the probability of the $c_i$ to be chosen as the most qualified conversion candidate. The matching probability for a candidate string $c_i$ in a data resource ds is equal to a reciprocal of a product of the corresponding preference priority and authority priority. The higher the priority is (the highest being 1), the higher the probability of the $c_i$ to be chosen. Therefore, the maximum priority probability of $c_i$ over all data resources can be calculated. Based on this revision, the final probability of $c_i$ in (2) is further revised and calculated by (5):

$$P_{final}(c_i)=\phi \times P_{priority}(c_i)+(1-\phi)\times P_{interpolate}(c_i|c_{i-1}) \quad (5)$$

where $\phi$ is a weight of priority-based probability. The purpose is to balance the data resources and N-Gram-based calculation to identify the best candidate for conversion. The final probability of the $c_i$ to be chosen as the most qualified conversion candidate is determined by the maximum matching probability of the $c_i$ in all data resources and the conditional probability of $c_i$ in the string c using N-gram after the smoothing method. It is obtained through training and is described in the experiment section below.

To make the FCMD more efficient, we divide the FCMD matching into two main steps. The first step is to convert one-to-one characters and tag one-to-many characters by reverse maximum matching over all the data resources according to priories, so that the following step can concentrate on matching and converting one-to-many characters. In the second step, the matching calculation takes into account both priority probability and N-Gram-based probability. The entry identified with the highest probability is chosen as the source candidate string's most viable match in the target script. The third step is performing conversion and returning matched result.

Experiments and Evaluation of the Second Embodiment

The proposed FCMD model needs two training operations. The first one is to calculate the N-Gram-based probability, which needs to acquire words containing one-to-many characters with their frequencies of occurrence. A very large corpus, Tagged Chinese Gigaword Version 2.0[11], is used to train the model. It contains a total of more than 10 GB data or more than 2 million documents in TC. The data quality is also ensured [12]. The content corpus, i.e. the corpus of Tagged Chinese Gigaword V2.0 used for training is shown in FIG. 4.

This training only extracted words containing one-to-many characters for efficiency. Since these characters are of 378 groups involving 814 of such characters in total, the training time is acceptable. We totally extracted 129,431 words (in which a one-to-many character may occur at the beginning, in the middle, or at the end) with their frequencies of occurrence. FIG. 5 shows part of the trained result.

The purpose of the second training operation is to determine the optimal parameter, which is a balance weight between data resource matching and N-Gram computation. Experimental data is from the complete Wang and Wang's 271 sentences in their one-to-many dataset [4]. The dataset is mainly focused on one-to-many cases which are prone to incorrect conversions. Each one-to-many case is clearly tagged and verified thus it is suitable to be used as experimental dataset, which is also adopted in Li's experiments [2]. In the training, 30 sentences from the experimental dataset are used as the training dataset. It has been established that the best conversion result is when $\phi$ is 0.89. Therefore, we used this value in the later experiments.

A total of seven data resources are used for the Chinese character conversion experiments. Example of the data resources and the numbers of entries are listed in FIG. 6. It is worth noting that only entries containing one-to-many characters are collected from the data resources, for example, there are 51027 entries collected from Comprehensive Chinese Dictionary.

The evaluation method is based on the precision calculation defined in equation (6), which is a commonly used mechanism for information retrieval. In this formula, the "one-to-many cases" indicates all the one-to-many characters in the testing data and the "correctly converted cases" is all the correctly converted one-to-many characters in the conversion result.

$$\text{precision} = \frac{|\text{correctly converated cases}|}{|\text{one-to-many cases}|} \times 100\% \quad (6)$$

As mentioned earlier on, the remaining 241 sentences in Wang and Wang's published one-to-many dataset [4], after 30 sentences already being chosen as our training data, are used as testing dataset in the first experiment.

Figures 7, 8, 9:
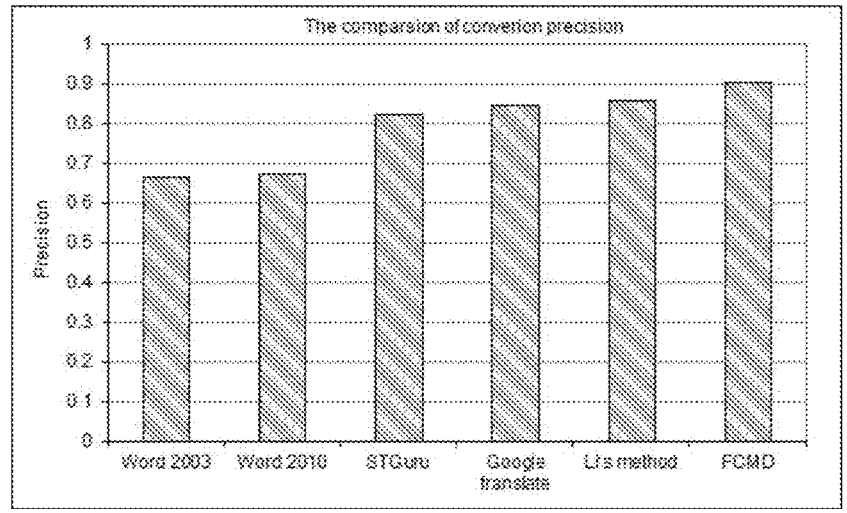
FIG. 7 is a schematic view exemplifying conversion precision of one-to-many cases for the evaluation of the second embodiment according to some aspect of the application.
FIG. 8 is a schematic view exemplifying overall precision rates for the evaluation of the second embodiment according to some aspect of the application.
FIG. 9 shows the running time of Li's algorithm and FCMD model on the Chinese I Ching text 《易經》 for the evaluation of the second embodiment according to some aspect of the application.

To verify its performance against the state-of-the-art operations, Li's method [2], which is reported to have produced much better results than other tools [2], and three very popular tools used in the information industry, i.e., Google Translate, Office 2003, and Office 2010, are selected as the baseline, together with STGuru [13]. STGuru is specifically incorporated as it claims to have a leading intelligent code conversion engine, and provide a full series of code conversion services of professional quality. In our experiment, all these systems have been used to convert the SC testing data into TC and results are compared against the ground truth, which is also provided by Wang and Wang's verified data [4]. The experimental results and comparison are shown in FIG. 7. From the figure we can see our proposed FCMD method attains 90.2% precision on the one-to-many character conversion, which is the most difficult part of the task. The precision rate of Google translate, Li's method and STGuru are 84.6%, 85.6 and 82.4%, respectively. Word 2003 has the lowest rate of 66.6%. Therefore, our method outperforms all the other systems on one-to-many character conversion.

We also test the systems on other types of characters than the one-to-many ones. A document from the National Palace Museum website was selected as the testing data since it provides standard SC and TC version. The evaluation method is to calculate the probability of correct conversion on all characters therein, which is similar to the equation (6). Experimental results on this document show that the overall conversion precision of the FCMD reaches 99.7%, which is slightly higher than the other systems. FIG. 8 shows overall precision rates Chinese character conversion by selected systems.

The conversion efficiency of our FCMD has also been evaluated and compared with Li's method, which is regarded as the best method prior to the FCMD. I Ching (《易經》), a classic text in Chinese philosophy, was used to test both systems. This text contains 29,264 Chinese characters and the size is 73.4 KB. Each algorithm converts it from SC to TC three times on the same computer to get more stable evaluation results. The running times were recorded. From comparison result, the average running time of the FCMD is 2.32 s, less than Li's 2.67 s with an improvement rate of 13%. Moreover, the efficiency of the FCMD can be further improved by enhancing the data resources that contain one-to-many words, since more straightforward conversion can further reduce the volume of computation caused by N-Gram calculation. FIG. 9 shows the running time of the two algorithms on I Ching text.

Chinese character conversion is becoming increasingly important in facilitating communication between Chinese communities. According to our observation, conversion tools currently in use tend to fall short of professional standards in terms of precision especially when the conversion involves one-to-many cases. This paper proposes a new priority-based data resource management model operating under two priorities: preference priority and authority priority, together with a new algorithm called "Fused Conversion Algorithm from Multi-Data resources (FCMD)" based on reverse maximum matching and a revised N-Gram-based statistical model which is a revised version of Statistical language model based on N-Gram calculations. The experimental results show that, our conversion method can ensure better character-conversion quality in terms of precision and responsiveness to regional character variations. It can disambiguate one-to-many conversion complexity not only on the character but also on the word level. With the training on a large-scale corpus, the precision rate of the FCMD reaches 90.2% on the one-to-many conversion and 99.7% on the overall conversion. It is thus outperforming the state-of-the-art baseline methods. The efficiency in terms of running time has also been observed.

This application proposes a "Fused Conversion model from Multi-Data resources (FCMD)". It represents a deep-level algorithm fusion rather than mere combination. The model is based on a revised N-Gram statistical model with large-scale corpus training Apart from the trained terms, it also draws on philological resources such as conversion-dedicated as well as general Chinese dictionaries to ensure authenticity and authority of the output. The reverse maximum matching algorithm it uses can also bring about high precision matching. With the help of an online segmentation dictionary, the model uses reverse maximum matching to convert the straightforward one-to-one and tag the troublesome one-to-many cases, and identification and conversion of the latter is conducted with further support from a revised N-Gram model, with a view to improving precision. Moreover, to benefit from advantages of different data resources, the priority-based data resource management model is proposed to enhance the data quality, which means users can decide in the process whether to activate a specific data resource, in order to render a character more in keeping with the target region usage. As such, it can greatly increase the conversion flexibility compared with the existing methods.

The application proposes a new priority-based multi-data resources management model. With this model, conversion can be more context-sensitive, human controllable, and thus more reliable. A new algorithm called Fused Conversion model from Multi-Data resources (FCMD) is also presented. This algorithm draws on the merits of reverse maximum matching and N-Gram-based statistical model to render the system more responsive to contextual nuances. After parameter training on a huge Tagged Chinese Gigaword corpus, the conversion precision of the proposed method reaches 90.2% on one-to-many cases, which are the most difficult part in Chinese character conversion, with an overall precision rate at 99.7%. Its experimental performance in terms of precision and efficiency promises a significant improvement over the state-of-the-art models.

Further, a system for character converting between different regional versions of a language is provided. According to one example shown in FIG. 1B, the system comprises: a computer processor in communication with a plurality of data resources that stores data items regarding different regional versions of a language, and a tangible memory that stores instructions for controlling the computer processor, the computer processor operative with the processing instructions for performing the above mentioned steps.

In addition, a tangible computer readable medium having instructions stored thereon is provided. When the instructions stored on the medium is executed by a processor in a computer system, the computer system can performing character conversion between different regional versions of a language by performing the above mentioned steps.

Although the present application has been described with reference to typical embodiments, it should be understood that the terminologies herein are for illustration purposes rather than to limit the present application. The present application can be implemented in many specific embodiments without departing from the spirit and scope of the present application, and thus it shall be appreciated that the above embodiments shall not be limited to any details described above, but shall be interpreted broadly within the scope defined by the appended claims. The appended claims intend to cover all the modifications and changes falling within the scope of the appended claims and equivalents thereof.

REFERENCES LIST

[1] Xiaoming Wang, Linmei Wei, "Discussion of Key Problems in Simplified-Traditional Chinese Character Conversion", In Proceedings of the 5th Chinese Digitization Forum, pp. 148-155, 2008.
[2] Min-Hsiang Li, Shih-Hung Wu, "Chinese Characters Conversion System based on Lookup Table and Language Model", In Proceedings of the Conference on Computational Linguistics and Speech Processing, pp. 113-127, 2010.
[3] Jack Halpern, Jouni Kerman, "The Pitfalls and Complexities of Chinese to Chinese Conversion", The CJK Dictionary Institute, Inc., Japan, 1999.
[4] Ning Wang, Xiaoming Wang, "The Conversion of Chinese Characters and its Communication in Greater China", In Proceedings of the 3th Chinese Digitization Forum, pp. 1-20, 2005.
[5] Jack Halpern, "Linguistic Issues in Chinese to Chinese Conversion", Multilingual Computing Inc., China, 1996.
[6] Huidan Liu, Jian Wu, "A Multi-Layer System of Simplified-Traditional Chinese Character Conversion Based on Word Disambiguation", In Proceedings of the 5th Chinese Digitization Forum, pp. 156-167, 2008.
[7] ChunshengXin, Yufang Sun, "Design and Implementation of a Simplified-Unsimplified Chinese Character Conversion System", Journal of Software, vol. 11, no. 11, pp. 1534-1540, 2000.
[8] Nanjing University of Aeronautics and Astronautics Library Group, "Collection and Application of WEB Information", Tsinghua University Press, China, 2005.
[9] Wei Zhang, Lincong Yang, Xingming Sun, Hengfu Yang, Yuling Liu, "An Effective Method of Arbitrary Length N-gram Statistics", JCIT: Journal of Convergence Information Technology, vol. 5, no. 3, pp. 143-155, 2011.
[10] Wei Zhang, Lincong Yang, Xingming Sun, Yuling Liu, "A Copy Detection Method for Chinese Text by Character Based N-gram", JCIT: Journal of Convergence Information Technology, vol. 6, no. 3, pp. 277-282, 2011.
[11] Tagged Chinese Gigaword Version 2.0, http://www.ldc.upenn.edu/Catalog/CatalogEntry.jsp?catalogId=LDC2009T14, 2011.
[12] Chu-Ren Huang, Lung-Hao Lee, Wei-guangQu, Jia-Fei Hong, ShiwenYu, "Quality Assurance of Automatic Annotation of Very Large Corpora: a Study based on heterogeneous Tagging System", In Proceedings of the 6th International Conference on Language Resources and Evaluation, pp. 2725-2'729, 2008.
[13] STGuru, http://www.speedy7.com/cn/stguru/english/index.html, 2011.

What is claimed is:

1. A computer-implemented method for character conversion between different regional versions of a language, the method comprising:
receiving, by a computer system, an input document comprising a plurality of source characters in a source regional version of a language, wherein the computer system comprises a computer processor and a tangible memory that stores instructions for controlling the computer processor, and wherein the computer system is in communication with a plurality of data resources that stores data items regarding the source regional version of the language and other regional versions of the language;
finding for each of the source characters, by the computer system, a target character in a target regional version of the language, from the plurality of data resources which are managed by the computer system using multiple categories with their priorities comprising at least one of two kinds of priorities: a relevance priority and an authority priority;
performing for all of the source characters of the input document, by the computer system, a conversion from the source regional version of the language to the target regional version of the language based on data items in a desired data resource of the plurality of data resources; and
outputting, by the computer system, a target document comprising the converted target characters;
wherein the input document comprises one or combination of a character, a word, a sentence, and m sentences; and the word consists of two or more characters, the sentence consists of two or more words; m is an integer greater than or equal to 2, and wherein
the source regional version of the language is one of simplified version and traditional version of Chinese character,
the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, and finding the target character for the source character and performing the conversion between Simplified Chinese and Traditional Chinese comprises:
 converting one-to-one characters and tag one-to-many characters by reverse maximum matching over all the data resources according to the priories; and
 matching and converting one-to-many characters using both priority probability and N-Gram-based probability.

2. The method of claim 1, wherein finding the target character for the source character comprises:
 finding data resources with highest relevance priority via the multiple categories distinguished by different levels of relevance priority which represents relevance to the terms/documents to be converted in terms of one or combination of regional usage and degree of formality;
 determining a data resource with highest authority priority within the data resources with the highest relevance priority as the desired data resource; and
 determining the target character in the desired data resource by performing a match for the source character at word level.

3. The method of claim 1, wherein finding the target character for the source character comprises:
 finding the desired data resource via the multiple categories indicated by both the relevance priority and the authority priority, together with usage conflict items which indicate usage conflict degrees of data resources within each category,
 the usage conflict degrees comprise any combination of at least "all", "optional" and "conflict".

4. The method of claim 1 wherein finding the target character for the source character comprises:
 simultaneous using both the relevance priority and the authority priority to calculate comprehensive priority values of candidate strings for a source string of a word comprising the source character; and
 determining a candidate string with highest comprehensive priority values as a matched string comprising the target character.

5. A system for character conversion between different regional versions of a language, comprising:
 a computer processor in communication with a plurality of data resources that stores data items regarding different regional versions of a language, and
 a tangible memory that stores instructions for controlling the computer processor, the computer processor operative with the processing instructions for receiving an input document comprising a plurality of source characters in a source regional version of the language;
 finding for each of the source characters, a target character in a target regional version of the language, from the plurality of data resources which are managed by the computer system using multiple categories with their priorities comprising at least one of two kinds of priorities: a relevance priority and an authority priority;
 performing for all of the source characters of the input document, a conversion from the source regional version of the language to the target regional version of the language based on data items in a desired data resource of the plurality of data resources; and
 outputting, by the computer system, a target document comprising the converted target characters;

wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, and/or the multiple categories are distinguished by the relevance priority which represents relevance to the terms/documents to be converted in terms of one or combination of regional usage and degree of formality so that levels of relevance priority are different among the multiple categories, and finding the target character for the source character and performing the conversion between Simplified Chinese and Traditional Chinese comprises:
 converting one-to-one characters and tag one-to-many characters by reverse maximum matching over all the data resources according to the priories; and
 matching and converting one-to-many characters using both priority probability and N-Gram-based probability.

6. The system of claim 5, wherein finding the target character for the source character comprises:
 finding data resources with highest relevance priority via the multiple categories distinguished by different levels of relevance priority;
 determining a data resource with highest authority priority within the data resources with the highest relevance priority as the desired data resource; and
 determining the target character in the desired data resource by performing a match for the source character at word level.

7. The system of claim 5, wherein finding the target character for the source character comprises:
 finding the desired data resource via the multiple categories indicated by the priority items together with usage conflict items which indicate usage conflict degrees of data resources within each category,
 the usage conflict degrees comprise any combination of at least "all", "optional" and "conflict".

8. The system of claim 5, finding the target character for the source character comprises:
 simultaneous using both the relevance priority and the authority priority to calculate comprehensive priority values of candidate strings for a source string of a word comprising the source character; and
 determining a candidate string with highest comprehensive priority values as a matched string comprising the target character.

9. A non-transitory computer readable medium having instructions stored thereon which when executed by a processor in a computer system causes the computer system for character conversion between different regional versions of a language, the computer system being in communication with a plurality of data resources that stores data items regarding different regional versions of a language, the conversion of the computer system comprising:

receiving an input document comprising a plurality of source characters in a source regional version of the language;

finding for each of the source characters, a target character in a target regional version of the language, from the plurality of data resources which are managed by the computer system using multiple categories with their priorities comprising at least one of two kinds of priorities: a relevance priority and an authority priority;

performing for all of the source characters of the input document, a conversion from the source regional version of the language to the target regional version of the language based on data items in a desired data resource of the plurality of data resources; and outputting, by the computer system, a target document comprising the converted target characters;

wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, the multiple categories are distinguished by the relevance priority which represents relevance to the terms/documents to be converted in terms of one or combination of regional usage and degree of formality so that levels of relevance priority are different among the multiple categories, and finding the target character for the source character and performing the conversion between Simplified Chinese and Traditional Chinese comprises:

converting one-to-one characters and tag one-to-many characters by reverse maximum matching over all the data resources according to the priories; and matching and converting one-to-many characters using both priority probability and N-Gram-based probability.

10. The medium of claim 9, wherein finding the target character for the source character comprises:

finding data resources with highest relevance priority via the multiple categories distinguished by different levels of relevance priority;

determining a data resource with highest authority priority within the data resources with the highest relevance priority as the desired data resource; and determining the target character in the desired data resource by performing a match for the source character at word level.

11. The medium of claim 9, wherein finding the target character for the source character comprises:

finding the desired data resource via the multiple categories indicated by the priority items together with usage conflict items which indicate usage conflict degrees of data resources within each category, the usage conflict degrees comprise any combination of at least "all", "optional" and "conflict".

12. The medium of claim 9, finding the target character for the source character comprises:

simultaneous using both the relevance priority and the authority priority to calculate comprehensive priority values of candidate strings for a source string of a word comprising the source character; and determining a candidate string with highest comprehensive priority values as a matched string comprising the target character.

13. A computer-implemented method for character conversion between different regional versions of a language, the method comprising:

receiving, by a computer system, an input document comprising a plurality of source characters in a source regional version of a language, wherein the computer system comprises a computer processor and a tangible memory that stores instructions for controlling the computer processor, and wherein the computer system is in communication with a plurality of data resources that stores data items regarding the source regional version of the language and other regional versions of the language;

finding for each of the source characters, by the computer system, a target character in a target regional version of the language, from the plurality of data resources which are managed by the computer system using multiple categories with their priorities comprising at least one of two kinds of priorities: a relevance priority and an authority priority;

performing for all of the source characters of the input document, by the computer system, a conversion from the source regional version of the language to the target regional version of the language based on data items in a desired data resource of the plurality of data resources; and outputting, by the computer system, a target document comprising the converted target characters;

wherein the input document comprises one or combination of a character, a word, a sentence, and m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, and finding the target character for the source character comprises:
    finding data resources with highest relevance priority via the multiple categories distinguished by different levels of relevance priority which represents relevance to the terms/documents to be converted in terms of one or combination of regional usage and degree of formality;
    determining a data resource with highest authority priority within the data resources with the highest relevance priority as the desired data resource; and
    determining the target character in the desired data resource by performing a match for the source character at word level.

14. A computer-implemented method for character conversion between different regional versions of a language, the method comprising:
    receiving, by a computer system, an input document comprising a plurality of source characters in a source regional version of a language, wherein the computer system comprises a computer processor and a tangible memory that stores instructions for controlling the computer processor, and wherein the computer system is in communication with a plurality of data resources that stores data items regarding the source regional version of the language and other regional versions of the language;
    finding for each of the source characters, by the computer system, a target character in a target regional version of the language, from the plurality of data resources which are managed by the computer system using multiple categories with their priorities comprising at least one of two kinds of priorities: a relevance priority and an authority priority;
    performing for all of the source characters of the input document, by the computer system, a conversion from the source regional version of the language to the target regional version of the language based on data items in a desired data resource of the plurality of data resources; and
    outputting, by the computer system, a target document comprising the converted target characters;
    wherein the input document comprises one or combination of a character, a word, a sentence, and m sentences; and
    the word consists of two or more characters, the sentence consists of two or more words; m is an integer greater than or equal to 2, and wherein
    the source regional version of the language is one of simplified version and traditional version of Chinese character,
    the target regional version of the language is the other of the simplified version and traditional version of Chinese character,
    the data resources comprise authoritative publications and informal on-line resources,
    the categories comprise any combination of at least personal category, regional terms category, words category, one-to-many characters category, and one-to-one characters category,
    the categories are indicated by priority items which indicate levels of at least the two kinds of priorities, and
    finding the target character for the source character comprises:
        finding the desired data resource via the multiple categories indicated by the priority items together with usage conflict items which indicate usage conflict degrees of data resources within each category, the usage conflict degrees comprise any combination of at least "all", "optional" and "conflict".

15. A computer-implemented method for character conversion between different regional versions of a language, the method comprising:
    receiving, by a computer system, an input document comprising a plurality of source characters in a source regional version of a language, wherein the computer system comprises a computer processor and a tangible memory that stores instructions for controlling the computer processor, and wherein the computer system is in communication with a plurality of data resources that stores data items regarding the source regional version of the language and other regional versions of the language;
    finding for each of the source characters, by the computer system, a target character in a target regional version of the language, from the plurality of data resources which are managed by the computer system using multiple categories with their priorities comprising at least one of two kinds of priorities: a relevance priority and an authority priority;
    performing for all of the source characters of the input document, by the computer system, a conversion from the source regional version of the language to the target regional version of the language based on data items in a desired data resource of the plurality of data resources; and
    outputting, by the computer system, a target document comprising the converted target characters;
    wherein the input document comprises one or combination of a character, a word, a sentence, and m sentences; and
    the word consists of two or more characters, the sentence consists of two or more words; m is an integer greater than or equal to 2, and wherein
    the source regional version of the language is one of simplified version and traditional version of Chinese character,
    the target regional version of the language is the other of the simplified version and traditional version of Chinese character,
    the data resources comprise authoritative publications and informal on-line resources,
    the categories comprise any combination of at least personal category, regional terms category, words category, one-to-many characters category, and one-to-one characters category,
    the categories are indicated by priority items which indicate levels of at least the two kinds of priorities, and
    finding the target character for the source character comprises:
        simultaneous using both the relevance priority and the authority priority to calculate comprehensive priority values of candidate strings for a source string of a word comprising the source character; and
        determining a candidate string with highest comprehensive priority values as a matched string comprising the target character.

16. A system for character conversion between different regional versions of a language, comprising:
    a computer processor in communication with a plurality of data resources that stores data items regarding different regional versions of a language, and
    a tangible memory that stores instructions for controlling the computer processor, the computer processor operative with the processing instructions for receiving an input document comprising a plurality of source characters in a source regional version of the language;
finding for each of the source characters, a target character in a target regional version of the language, from the plurality of data resources which are managed by the computer system using multiple categories with their priorities comprising at least one of two kinds of priorities: a relevance priority and an authority priority;
performing for all of the source characters of the input document, a conversion from the source regional version of the language to the target regional version of the language based on data items in a desired data resource of the plurality of data resources; and
outputting, by the computer system, a target document comprising the converted target characters;
wherein the input document comprises one or combination of a character, a word, a sentence, m sentences; and
the word consists of two or more characters, the sentence consists of two or more words; m is an integer greater than or equal to 2, and wherein
the source regional version of the language is one of simplified version and traditional version of Chinese character,
the target regional version of the language is the other of the simplified version and traditional version of Chinese character,
the data resources comprise authoritative publications and informal on-line resources,
the categories comprise any combination of at least personal category, regional terms category, words category, one-to-many characters category, and one-to-one characters category,
the categories are indicated by priority items which indicate levels of at least the two kinds of priorities, and/or
the multiple categories are distinguished by the relevance priority which represents relevance to the terms/documents to be converted in terms of one or combination of regional usage and degree of formality so that levels of relevance priority are different among the multiple categories, and
finding the target character for the source character comprises:
finding data resources with highest relevance priority via the multiple categories distinguished by different levels of relevance priority;
determining a data resource with highest authority priority within the data resources with the highest relevance priority as the desired data resource; and
determining the target character in the desired data resource by performing a match for the source character at word level.

17. A system for character conversion between different regional versions of a language, comprising:
a computer processor in communication with a plurality of data resources that stores data items regarding different regional versions of a language, and
a tangible memory that stores instructions for controlling the computer processor, the computer processor operative with the processing instructions for receiving an input document comprising a plurality of source characters in a source regional version of the language;
finding for each of the source characters, a target character in a target regional version of the language, from the plurality of data resources which are managed by the computer system using multiple categories with their priorities comprising at least one of two kinds of priorities: a relevance priority and an authority priority;
performing for all of the source characters of the input document, a conversion from the source regional version of the language to the target regional version of the language based on data items in a desired data resource of the plurality of data resources; and
outputting, by the computer system, a target document comprising the converted target characters;
wherein the input document comprises one or combination of a character, a word, a sentence, m sentences; and
the word consists of two or more characters, the sentence consists of two or more words; m is an integer greater than or equal to 2, and wherein
the source regional version of the language is one of simplified version and traditional version of Chinese character,
the target regional version of the language is the other of the simplified version and traditional version of Chinese character,
the data resources comprise authoritative publications and informal on-line resources,
the categories comprise any combination of at least personal category, regional terms category, words category, one-to-many characters category, and one-to-one characters category,
the categories are indicated by priority items which indicate levels of at least the two kinds of priorities, and/or
the multiple categories are distinguished by the relevance priority which represents relevance to the terms/documents to be converted in terms of one or combination of regional usage and degree of formality so that levels of relevance priority are different among the multiple categories, and
finding the target character for the source character comprises:
finding the desired data resource via the multiple categories indicated by the priority items together with usage conflict items which indicate usage conflict degrees of data resources within each category,
the usage conflict degrees comprise any combination of at least "all", "optional" and "conflict".

18. A system for character conversion between different regional versions of a language, comprising:
a computer processor in communication with a plurality of data resources that stores data items regarding different regional versions of a language, and
a tangible memory that stores instructions for controlling the computer processor, the computer processor operative with the processing instructions for receiving an input document comprising a plurality of source characters in a source regional version of the language;
finding for each of the source characters, a target character in a target regional version of the language, from the plurality of data resources which are managed by the computer system using multiple categories with their priorities comprising at least one of two kinds of priorities: a relevance priority and an authority priority;
performing for all of the source characters of the input document, a conversion from the source regional version of the language to the target regional version of the language based on data items in a desired data resource of the plurality of data resources; and
outputting, by the computer system, a target document comprising the converted target characters;
wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, and/or the multiple categories are distinguished by the relevance priority which represents relevance to the terms/documents to be converted in terms of one or combination of regional usage and degree of formality so that levels of relevance priority are different among the multiple categories, and the target character for the source character comprises:
simultaneous using both the relevance priority and the authority priority to calculate comprehensive priority values of candidate strings for a source string of a word comprising the source character; and
determining a candidate string with highest comprehensive priority values as a matched string comprising the target character.

19. A non-transitory computer readable medium having instructions stored thereon which when executed by a processor in a computer system causes the computer system for character conversion between different regional versions of a language, the computer system being in communication with a plurality of data resources that stores data items regarding different regional versions of a language, the conversion of the computer system comprising:

receiving an input document comprising a plurality of source characters in a source regional version of the language;

finding for each of the source characters, a target character in a target regional version of the language, from the plurality of data resources which are managed by the computer system using multiple categories with their priorities comprising at least one of two kinds of priorities: a relevance priority and an authority priority;

performing for all of the source characters of the input document, a conversion from the source regional version of the language to the target regional version of the language based on data items in a desired data resource of the plurality of data resources; and outputting, by the computer system, a target document comprising the converted target characters;

wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, the multiple categories are distinguished by the relevance priority which represents relevance to the terms/documents to be converted in terms of one or combination of regional usage and degree of formality so that levels of relevance priority are different among the multiple categories, and finding the target character for the source character comprises:
finding data resources with highest relevance priority via the multiple categories distinguished by different levels of relevance priority;
determining a data resource with highest authority priority within the data resources with the highest relevance priority as the desired data resource; and
determining the target character in the desired data resource by performing a match for the source character at word level.

20. A non-transitory computer readable medium having instructions stored thereon which when executed by a processor in a computer system causes the computer system for character conversion between different regional versions of a language, the computer system being in communication with a plurality of data resources that stores data items regarding different regional versions of a language, the conversion of the computer system comprising:

receiving an input document comprising a plurality of source characters in a source regional version of the language;

finding for each of the source characters, a target character in a target regional version of the language, from the plurality of data resources which are managed by the computer system using multiple categories with their priorities comprising at least one of two kinds of priorities: a relevance priority and an authority priority;

performing for all of the source characters of the input document, a conversion from the source regional version of the language to the target regional version of the language based on data items in a desired data resource of the plurality of data resources; and outputting, by the computer system, a target document comprising the converted target characters;

wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, the multiple categories are distinguished by the relevance priority which represents relevance to the terms/documents to be converted in terms of one or combination of regional usage and degree of formality so that levels of relevance priority are different among the multiple categories, and finding the target character for the source character comprises:

finding the desired data resource via the multiple categories indicated by the priority items together with usage conflict items which indicate usage conflict degrees of data resources within each category, the usage conflict degrees comprise any combination of at least "all", "optional" and "conflict".

21. A non-transitory computer readable medium having instructions stored thereon which when executed by a processor in a computer system causes the computer system for character conversion between different regional versions of a language, the computer system being in communication with a plurality of data resources that stores data items regarding different regional versions of a language, the conversion of the computer system comprising:

receiving an input document comprising a plurality of source characters in a source regional version of the language;

finding for each of the source characters, a target character in a target regional version of the language, from the plurality of data resources which are managed by the computer system using multiple categories with their priorities comprising at least one of two kinds of priorities: a relevance priority and an authority priority;

performing for all of the source characters of the input document, a conversion from the source regional version of the language to the target regional version of the language based on data items in a desired data resource of the plurality of data resources; and outputting, by the computer system, a target document comprising the converted target characters;

wherein the input document comprises one or combination of a character, a word, a sentence, m sentences; and the word consists of two or more characters, the sentence consists of two or more words; m is an integer greater than or equal to 2, and wherein the source regional version of the language is one of simplified version and traditional version of Chinese character, the target regional version of the language is the other of the simplified version and traditional version of Chinese character, the data resources comprise authoritative publications and informal on-line resources, the categories comprise any combination of at least personal category, regional terms category, words category, one-to-many characters category, and one-to-one characters category, the categories are indicated by priority items which indicate levels of at least the two kinds of priorities, the multiple categories are distinguished by the relevance priority which represents relevance to the terms/documents to be converted in terms of one or combination of regional usage and degree of formality so that levels of relevance priori are different among the multiple categories, and finding the target character for the source character comprises:

simultaneous using both the relevance priority and the authority priority to calculate comprehensive priority values of candidate strings for a source string of a word comprising the source character; and determining a candidate string with highest comprehensive priority values as a matched string comprising the target character.

* * * * *